Aug. 9, 1966 E. E. FITZPATRICK ETAL 3,264,721

APPARATUS FOR POSITIONING AND ALIGNING A PLURALITY OF PINS

Filed Oct. 11, 1963 3 Sheets-Sheet 1

EDWARD E. FITZPATRICK,
GUNDUS ERKAN,
INVENTORS

By THEIR. ATTORNEYS
Spensley & Horn.

Aug. 9, 1966 E. E. FITZPATRICK ETAL 3,264,721

APPARATUS FOR POSITIONING AND ALIGNING A PLURALITY OF PINS

Filed Oct. 11, 1963 3 Sheets-Sheet 2

INVENTORS.
EDWARD E. FITZPATRICK,
GUNDUS ERKAN,

BY THEIR ATTORNEYS
Spensley & Horn.

Aug. 9, 1966 E. E. FITZPATRICK ETAL 3,264,721

APPARATUS FOR POSITIONING AND ALIGNING A PLURALITY OF PINS

Filed Oct. 11, 1963 3 Sheets-Sheet 3

INVENTORS
EDWARD E. FITZPATRICK,
GUNDUS ERKAN,
BY THEIR ATTORNEYS.
Spensley & Horn 3,264,721

APPARATUS FOR POSITIONING AND ALIGNING A PLURALITY OF PINS

Edward E. FitzPatrick, Manhattan Beach, and Gundus Erkan, Hollywood, Calif., assignors to TRW Semiconductors, Inc., a corporation of Delaware

Filed Oct. 11, 1963, Ser. No. 315,457
5 Claims. (Cl. 29—200)

This invention relates to an improved planar diode package and to the apparatus for assembly of similar semiconductor devices. More particularly, this invention relates to the apparatus for packaging planar diodes and similar devices in encapusulating, hermetically sealed envelopes.

In the manufacture of certain electrical devices, it is especially important to ensure consistent operation and long life of the electrical elements forming the heart of these devices. Such devices are commonly encapsulated in hermetically sealed envelopes. Various types of encapsulating structures have been designed to protect the electrical element from chemical contamination, to provide good thermal dissipation, shock and vibration resistance, and to permit ease of connection.

It has long been recognized in the semiconductor art that the mounting of a semiconductor device within a miniaturized cylindrical housing having a central region composed of a glass tube, affords a foundation for designing an ideal hermetically sealed package. One such package is described and claimed in U.S. Patent No. 2,815,474, entitled "Glass Sealed Semiconductor Rectifier," issued December 3, 1957, to William M. Lewis, Jr. et al. This particular package includes a central glass cylinder to which is sealed a pair of tubular metal shells at opposite ends thereof. The resulting assembly is called a fused body subassembly. Such fused body subassemblies are commonly formed by fusing the metal shells to opposite ends of the glass cylinder by means of a fusion machine utilizing radio-frequency energy to supply the necessary heat. Metal connecting pins of electrodes are inserted into the metal shells at the opposite ends of the glass cylinder. At the inner end of one pin is welded a resilient whisker element which the semiconductor device is ohmically bonded to the inner end of the other pin. When the pins are inserted into the shells, the free end of the resilient whisker element contacts the top surface of the semiconductor device to complete the connection. Thereafter the shells are bonded by welding to their respective pins to complete the fabrication.

This type of fabrication is quite satisfactory for the packaging of semiconductor devices, such as diffusion or alloy-type diodes wherein substantially all of the top surface thereof is of a material that exhibits one type of conductivity. Where, however, this surface is covered except for a very small exposed opening, such as with a planar diode for example, there is great difficulty in establishing contact therein with the whisker element.

One solution to this difficulty in the assembly of semiconductor devices is disclosed in copending application Serial No. 318,597, filed October 24, 1963, by Ernie A. Ferris, and entitled "Method and Apparatus for Assembly of Semiconductor Devices," having the same assignee. According to the Ferris invention, the whisker element was first bonded to the semiconductor device through its exposed opening, and thereafter the whisker element was mated to the end of the electrode not having the semiconductor device thereon. This electrode is hereinafter called a "dummy pin." After the whisker element was thus connected, the fused body subassembly was positioned thereover for final assembly and welded both to the dummy pin and to the electrode with the semiconductor device thereon, hereinafter called the "crystal pin."

The present invention is directed to a novel planar diode package and to the method and apparatus for efficiently packaging these and similar semiconductor devices in encapsulating, hermetically-sealed envelopes. Semiconductor devices of the planar diode type consist of a semiconductor material of which a portion is of N type conductivity and part of its top surface has a P type conductivity impurity diffused therein. Except for the very small opening over a part of the P type area, on the order of 5 mils, the top surface is covered with an insulating cover of oxide. Through this small opening a metalized ohmic contact surface, such as an alloy of gold-nickel, has been provided over the exposed P type area. A silver contact is plated over the metalized surface and a whisker wire is thermally compressed or nailhead bonded to the silver. Suitable jigs containing dummy pins and crystal pins align the pins so that the whisker wires, already nailhead bonded to the crystal pins, are automatically positioned on relatively large flat surface areas on tapered ends of the dummy pins for welding. These pins are positioned so these areas are in a plane parallel with the axes of the whisker wires. After welding the whisker wires to the dummy pins, the two sets of pins are moved relative to each other so as to provide a controlled slack in the whisker wires when the sealing and supporting envelopes are positioned over the pins for welding. This slack is desirable since a wire would break loose in use or when subsequent environmental testing, may subject the completed package to expansion and contraction of its various components.

It is therefore an object of the present invention to provide for an improved method and apparatus for the assembly of the semiconductor devices.

Another object of the present invention is to provide a semiconductor package of low cost and high reliability through efficient assembly of components in the fabrication thereof.

Another object of the present invention is the provision of a novel planar diode package that is sturdy in its construction, reliable in its operation, and economical in its manufacture.

Yet another object is the provision of a jig for holding many semiconductor components throughout their assembly stages in the fabrication of semiconductor packages.

Other objects and advantages will become apparent as a more detailed description of the invention proceeds with reference to the drawings, wherein.

Figures 1, 2, 3, 4, 6, 8:
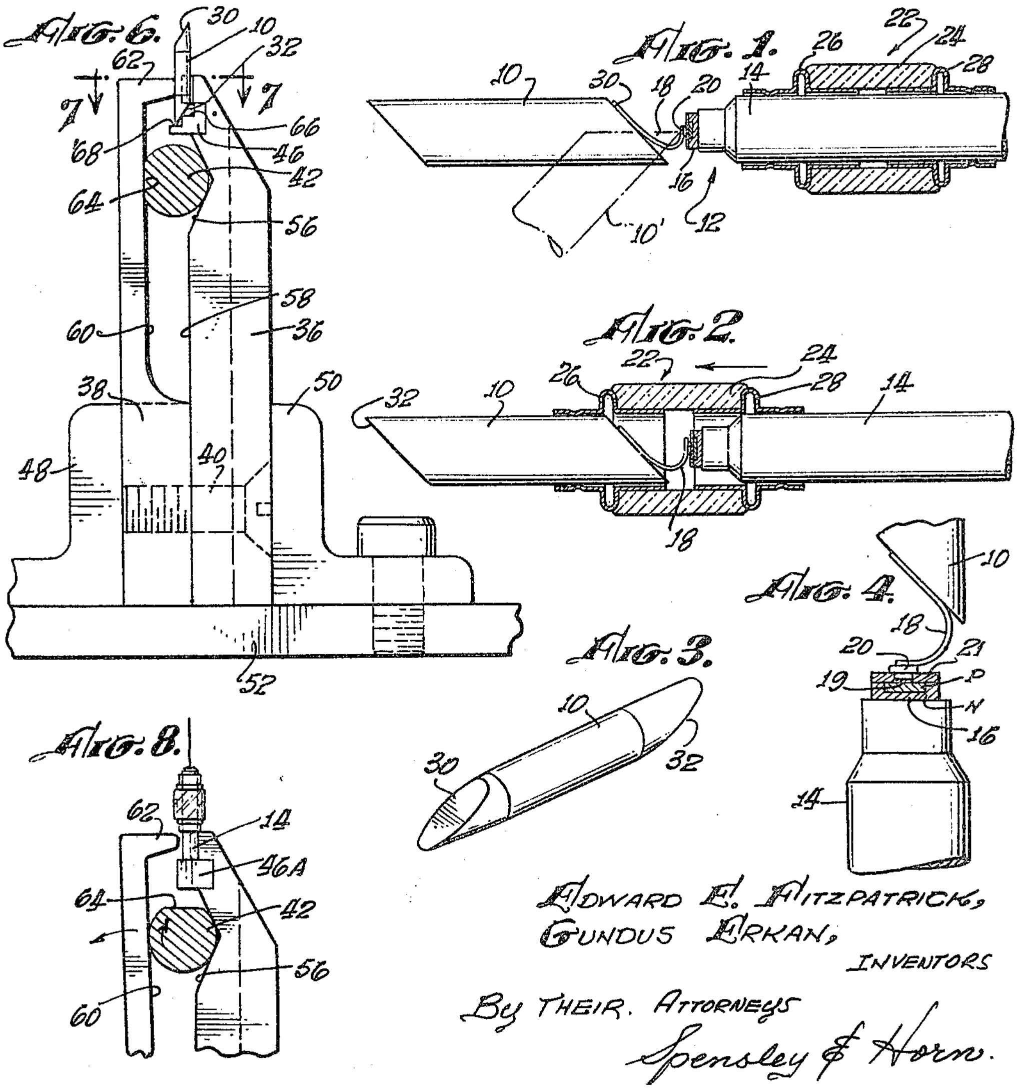
FIGURE 1 is an elevational view, partly in section, showing a semiconductor package in an intermediate state of assembly.
FIGURE 2 is an elevational view, partly in section, showing a preferred form of semiconductor package made in accordance with the present invention.
FIGURE 3 is a perspective view of one of the dummy pins used in the package.
FIGURE 4 is an enlarged view, partly in section, showing the whisker connections.
FIGURE 6 is an end view of the jig subassembly with dummy pins clamped therein.
FIGURE 8 is a partial end view of the jig subassembly in unclamped condition with crystal pins positioned therein.

Referring now to FIGURE 1, there is shown a first subassembly consisting of dummy electrode pin 10, a second subassembly 12 consisting of crystal electrode pin 14, a semiconductor element 16, such as a planar diode for example, and whisker element 18 bonded to exposed surface preferably is a silver contact plated over a metalized surface 19, such as a gold-nickel alloy, deposited on the P type material to which contact with wisker element 18 is desired. An oxide coating 21 was used initially as a mask in defining the region where the P type impurity, such as boron for example, was diffused into the N type material. This oxide coating remains as a masking when the gold-nickel alloy 19 is deposited on the P type material and again when silver contact 20 is placed thereon. The gold-nickel alloy metalized surface preferably is only a few angstroms thick and the silver contact 20 preferably is on the order of 5 mils diameter at its build-up surface over the oxide to provide an optimum contact surface for the wisker wire 18 which is on the order of 2 mils in diameter. This wire is of gold or other nonresilient malleable metal, the end of which forms a ball when exposed to heat used in cutting the wire from a longer length. This end of wire 18 is then welded under suitable heat and pressure to the silver-plated exposed surface 20 of diode 16 with a commercially available device known as a nailhead bonder. After welding this end of the gold wire to the silver-plated exposed surface 20, the wire is cut to a length of about 75 mils.

A third subassembly 22 consists of an annular insulator member 24, such as a glass cylinder, with "bumped" or beaded tubes 26, 28 bonded at each end thereof as taught by the Lewis et al. patent earlier mentioned. This third subassembly or housing 22 is next positioned over electrode pin 14 and slidably positioned away from its inner end with the diode 16 thereon. The next step is to position whisker element 18 in contact with the inner end 30 of dummy pin 10 and make a bonding connection therebetween, such as by welding. This inner end 30 of the dummy pin 10 is tapered so as to provide an optimum welding surface. For this purpose, the pin 10 is at an angle of about 30° so that this surface will be parallel to the axis of the whisker element 18. This position is shown in phantom as 10'. The angle of tilt corresponds with the angle of the end surface 30 with the axis of the pin 10. The pin 10 is then moved to be in axial alignment with pin 14 and, as shown in FIGURES 2 and 4, the pins 10 and 14 are moved together slightly to reduce any tension on the whisker element 18 and to provide it with slack. Slack in the whisker element 18 prevents its breakage under the shock or vibrational conditions to which the package may be subjected; hence increasing the reliability of the package. The enlarged view in FIGURE 4 shows the whisker element 18 under slack after connection with dummy pin 10.

The third subassembly 22 is then slidably positioned over the inner ends of both electrode pins 10 and 14 and bonded thereto to hermetically seal the envelope thus formed for the semiconductor element 16. While this particular type of third subassembly, known as a bumped tube body, is used for purposes of explaining the present invention, it is to be understood that other types of housing assemblies may be used, if desired. The housing assembly may also be positioned over dummy pin 10 instead of over crystal pin 14 before welding whisker element 18 to pin 10, if desired. A perspective view of dummy pin 10 is shown in FIGURE 3. Both ends 30 and 32 are tapered and in parallel relationship. The cross-sectional area of the pin is also tapered at these ends to give them a truncated conical shape so that the third subassembly may be easily slidably positioned over the inner end 30 and so that the outer end 32 may conveniently fit within the female socket (not shown) for which it is intended. As will be shown in connection with FIGURE 6, the taper of the outer end 32 is used to advantage in correctly positioning the dummy pin 10 in a jig subassembly for welding in such a manner that the inner surface 30 will be parallel to the axis of the whisker element 18.

Because the whisker element 18 is quite delicate and because the parts are quite small and difficult to handle, a unique jig subassembly has been designed to handle these subassemblies in their assembly into packages. This subassembly fixture is shown in FIGURES 5, 6, 7, and 8.

Figures 5, 7:
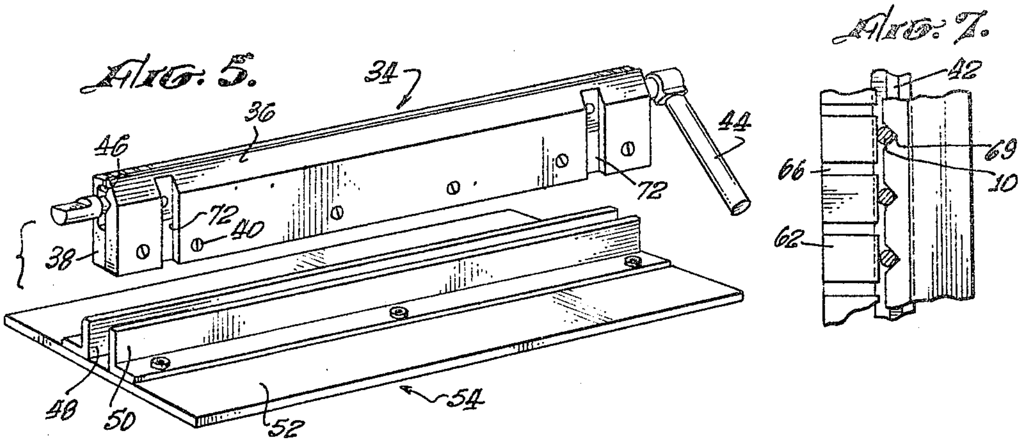
FIGURE 5 is a perspective view of a jig subassembly for holding semiconductor terminal pins.
FIGURE 7 is a partial plan view taken along the line 7—7 of FIGURE 6.

Referring now to FIGURE 5, there is shown a jig subassembly or loading fixture 34. This holding fixture 34 consists of a backing plate 36 and a gripping plate 38 secured together at the bottom as by bolts 40 with a cam rod 42 positioned therebetween near the top. A removable handle 44 rotates the cam rod 42 to pry the two plates apart at the top so that a plurality of pins, either pins 10 or pins 14, may be inserted therein. A suitable stop bar 46 on the inner surface of backing plate 36 limits the depth to which these pins may be inserted. Before loading the pins, the holding fixture 34 is positioned vertically between spaced-apart channels 48, 50 and secured to a base 52 of the loading fixture 54.

As shown by the end view of FIGURE 6, the backing plate 36 has a notched portion 56 extending transversely along the inner surface 58 near the top. Gripping plate 38 has an inner surface 60 and inwardly directed fingers 62 along the top edge. Positioned within the notched portion 56 is cam rod 42 having a flat surface 64. This rod is of such size that when the flat surface 64 abuts the inner surface 60 of the gripping plate 38, the fingers 62 will frictionally engage the pins 10 and retain them against upper inner edge of the backing plate 36.

As shown in FIGURE 8, when cam rod 42 is rotated so that its flat surface 64 no longer engages the inner surface 60, the fingers 62 are forced outwardly away from the connecting pins to permit their insertion or removal. Also mounted longitudinally within the backing plate 36 along its inner surface is a stop bar 46. This is shown in rectangular cross-sectional form as 46A in FIGURE 8 and in stairstep cross-section in FIGURE 6. The stairstep cross-section cooperates with the outer tapered end 32 to ensure that the inner end 30 of the pin 10 always has its tapered surface in the position shown. If this surface has been accidentally rotated, the inner end 32 would find its point on a higher step 66 and that particular pin 10 would stick out above the other pins mounted in the holding fixture and would be readily detected. When rotated to its proper position, the pin readily drops down to the lowermost step 68 and its pin height then becomes the same as the others. With the exception of the configuration of the stop bars 46 in FIGURE 6 and 46A in FIGURE 8, the holding fixtures for the dummy pins 10 and the crystal pins 14 are the same. This one difference, however, determines which holding fixture is to be used with the particular row of pins, it being understood that all pins in the single holding fixture will either be dummy pins 10 or crystal pins 14.

In order to provide additional resiliency in the gripping plate 38, vertical slots 66 are provided, as shown in FIGURE 7, so that the fingers 62 may be individually urged outwardly by the cam rod 42. Suitable notches 69 are provided in backing plate 36 so that the pins are in vertically and longitudinally spaced alignment. When the fingers 62 are opened and the pins have been inserted, such as by the use of tweezers, and the fingers 62 have been returned to the closed position, the holding fixture 34 is then ready for positioning on the assembly jig frame 70 shown in FIGURE 9.

Figures 9, 10, 11, 12:
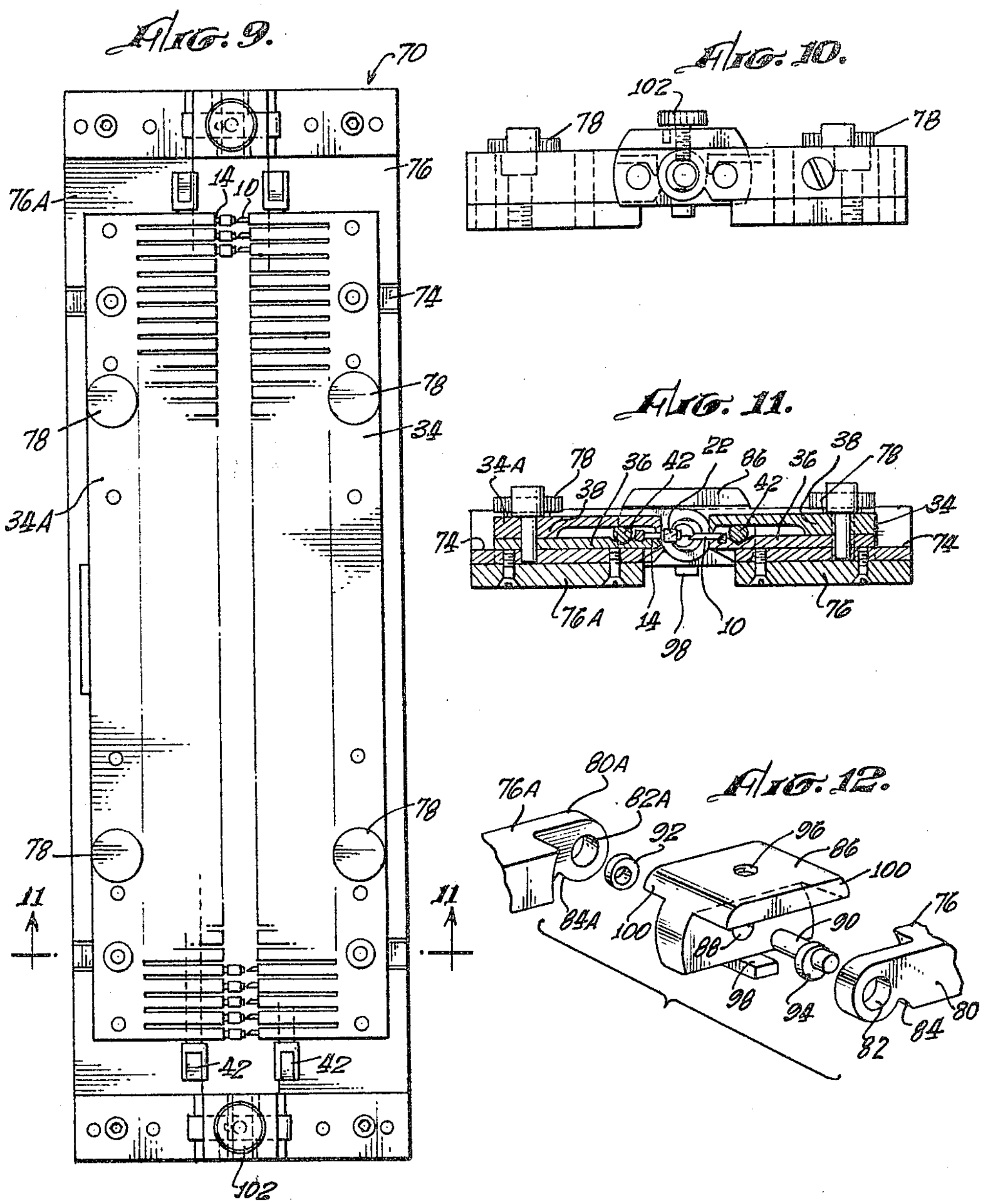
FIGURE 9 is a plan view of the jig assembly.
FIGURE 10 is an end view.
FIGURE 11 is an elevational sectional view taken along the line 11—11 of FIGURE 9.
FIGURE 12 is an exploded perspective partial view of the hinge arrangement.

As shown in FIGURE 9, vertically grooved portions 72 of the holding fixture 34, shown in FIGURE 5, fit over raised guides 74 extending transversely across section 76 of the assembly jig frame 70. The holding fixture 34 having the dummy pins 10 therein is positioned on section 76 and loading fixture 34A is positioned in section 76A. This loading fixture has crystal pins 14 and fused bodies 22 therein. Suitable clamp screws 78 secure the loading fixtures with the two sets of pins properly spaced a predetermined distance apart. This spacing is done when the sections are flat and extend in planar alignment, as shown in FIGURES 10 and 11. The assembly jig frame 70 has two principal features. The first is that the holding fixture assembly jig sections 76, 76A are angularly pivotal to the position shown in FIGURE 13 for the ultrasonic welding of the whisker element to the inner ends of the dummy pins. The second feature is that when the jig sections are again in planar alignment, such as in FIGURE 15, for tack welding of the housing thereover, the whisker element has a desired controlled slack between the pins so that the whisker element will be less apt to break in subsequent environmental testing when the package is subjected to shock, vibration, and expansion and contraction of components with temperature changes.

In order to accomplish these features, an eccentric hinging arrangement is provided at each end of the sections to connect them. Such an arrangement is best shown in FIGURE 12 wherein a portion of section 76 is shown with an inwardly extending ear 80 having an aperture 82 and a notched portion 84 therein. Similarly, the end of section 76A has an ear 80A with aperture 82A and notched portion 84A. Connecting bracket 86 has an aperture 88 into which pivot pin 90 is positioned. This pin 90 has a pair of offset bearings 92 and 94 which are adapted to be received in apertures 82A and 82, respectively, thereover. These offset bearings have thickened cam portions offset so that apertures 82 and 82A are not in axial alignment with the axis of the pin 90. These bearings are further rotated and positioned in such manner that sections 76 and 76A move inwardly when they are in planar alignment, as in FIGURES 10 and 11, but move outwardly away from each other when the sections 76A and 76 are angularly pivoted. A set screw 102, shown in FIGURE 9, in aperture 96 retains these bearings 92 and 94 in their proper positions or adjustments. Stop members 98 on connecting bracket 86 engage notches or notched portions 84, 84A on sections 76, 76A to limit the angular positioning of these sections. Bracket 86 has overhanging portions 100 to keep the fixtures in planar alignment when so positioned.

Figures 13, 15:
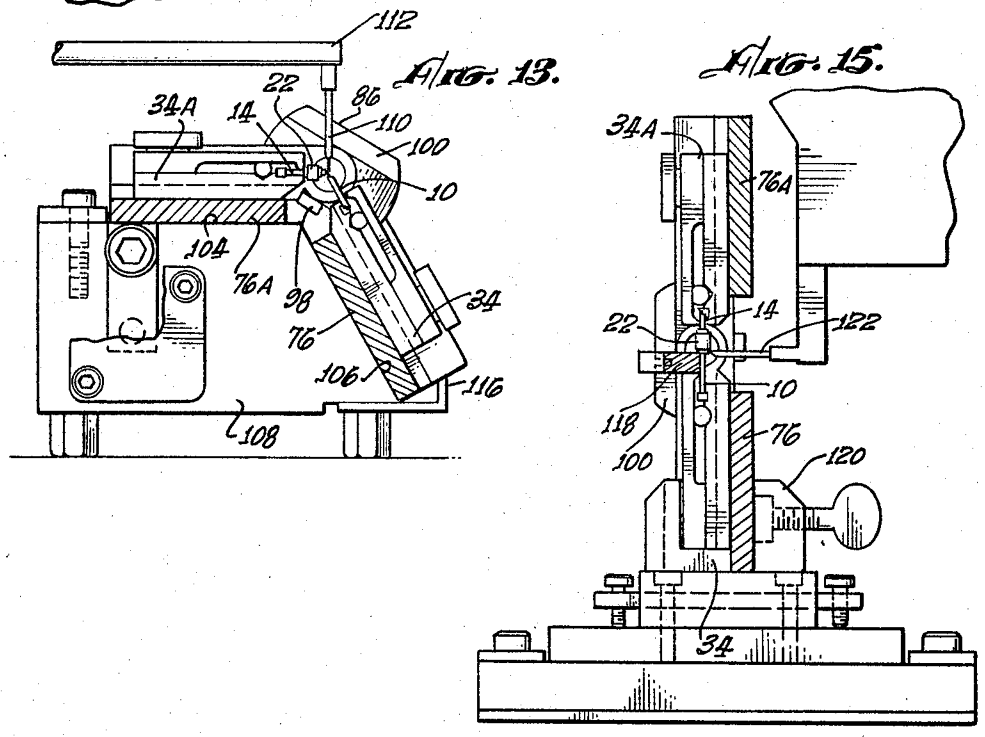
FIGURE 13 is an end view of the jig assembly positioned on the ultrasonic welding jig for a welding step in the assembly operation.
FIGURE 15 is an elevational view of the jig assembly mounted for the tackwelding operation.

After the assembly jig frame 70 has had holding fixtures 34, 34A positioned thereon and mounted on sections 76, 76A, the assembly jig frame is now ready for the ultrasonic welding of the whisker element to the dummy pin. For this purpose, the assembly jig frame is positioned as shown in FIGURE 13 with the holding fixture holding the crystal pins positioned horizontally on the top surface 104, and section 76 having the dummy pins rests against the inclined surface 106 of the ultrasonic weld jig 108. Pins 10 and 14 in FIGURE 13 have the same relative positions as pins 14 and 10 in position 10' in FIGURE 1. In this position, a welding element 110 on ultrasonic welding arm 112 welds the whisker element to the dummy pin 10. A ratchet arrangement 114, FIGURE 14, permits the positioning of each of the pins to be welded as the assembly jig frame 70 moves laterally across the ultrasonic weld jig 108 along a guide 116.

Figure 14:
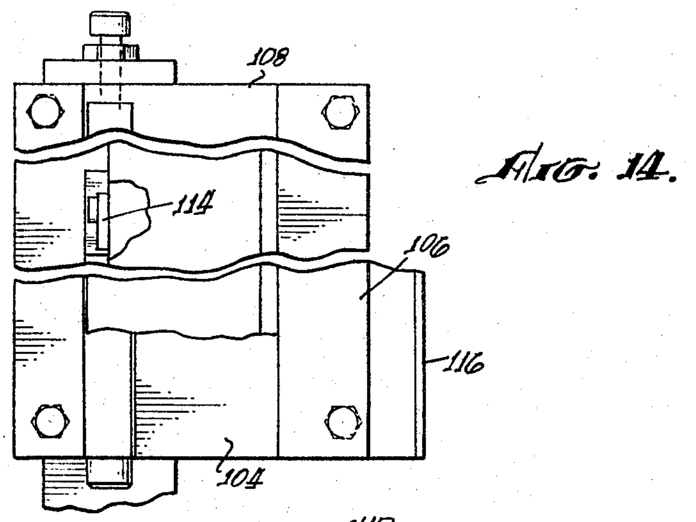
FIGURE 14 is a fragmentary plan view of the ultrasonic welding jig.
Figure 16:
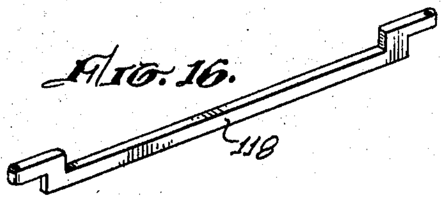
FIGURE 16 is a perspective view of the locating bar used in positioning the envelopes on the pins for welding.

The locating bar 118 shown in FIGURE 16 is used to position the third subassembly 22 in selected position along the pins 10 and for tackwelding as shown in FIGURE 14. The assembly jig frame 14 is vertically positioned in clamp 120 and tackwelder element 122 is moved along from pin-to-pin. The final welding stage to effect the hermetic sealing between the envelope 22 and the pins 10 and 12 is not shown since it is a conventional step now known in the art and is not considered a part of the present invention except in combination therewith.

Having thus described the preferred form of the present invention, it is to be understood that there are modifications and alterations thereof which will readily occur to those skilled in the art, and it is to be further understood that the foregoing description was for purposes of illustration only and the scope of the invention is not intended to be limited thereto, but to include all modifications and variations that come within the scope of the following claims.

What is claimed is:

1. A loading fixture for positioning, aligning, and retaining a plurality of pins comprising:
- a back plate having means to receive said pins in vertical spaced alignment;
- a gripping plate fastened to said backing plate;
- said gripping plate having means to engage pins and retain said pins in said backing plate;
- a cam rod between said backing plate and said gripping plate;
- said cam rod having a flat surface; and
- means for rotating said cam rod;
- said rod being of such size that when said flat surface abuts the inner surface of said gripping plate said pins are engaged and retained between said backing plate and said gripping plate;
- said gripping plate being forced outwardly away from said pins when said rod is rotated so that the flat surface no longer engages said inner surface.

2. A loading fixture for positioning, aligning, and retaining a plurality of pins comprising:
- a backing plate having means to receive said pins in vertical spaced alignment;
- a notched portion extending transversely along the inner surface of said backing plate;
- a gripping plate fastened to said backing plate;
- said gripping plate having means to engage and retain said pins against said backing plate;
- a cam rod in said notched portion;
- said cam rod having a flat surface; and
- means for rotating said cam rod;
- said rod being of such size that when said flat surface abuts the inner surface of said gripping plate said gripping plate frictionally engages said pins and retains them against the upper inner edge of said backing plate;
- said gripping plate being forced outwardly away from said pins when said rod is rotated so that said flat surface no longer engages said inner surface.

3. A loading fixture for positioning, aligning, and retaining a plurality of pins comprising:
- a backing plate having a plurality of notches on the inner surface along the top edge thereof to receive said pins in vertical spaced alignment;
- a stop bar on said inner surface parallel with and extending below said top edge;
- a notched portion extending transversely along the inner surface of said backing plate and below the stop bar;
- a gripping plate fastened to said backing plate;
- said gripping plate having means to engage pins and retain said pins against said backing plate;
- a cam rod in said notched portion;
- said cam rod having a flat surface; and
- a handle for rotating said cam rod;
- said rod being of such size that when said flat surface abuts the inner surface of said gripping plate said gripping plate frictionally engages said pins and retains them against the upper inner edge of said backing plate;

said gripping plate being forced outwardly away from said pins when said rod is rotated so that said flat surface no longer engages said inner surface.

4. A loading fixture for positioning, aligning, and retaining a plurality of pins comprising:

a backing plate having a plurality of notches on the inner surface along the top edge thereof to receive said pins in vertical spaced alignment;

a stop bar on said inner surface parallel with and extending below said top edge;

a notched portion extending transversely along the inner surface of said backing plate and below the stop bar;

a gripping plate fastened to said backing plate;

said gripping plate having inwardly directed fingers along the top edge thereof to engage and retain said pins in said notches on said backing plate;

a cam rod in said notched portion;

said cam rod having a flat surface; and a removable handle for rotating said cam rod;

said rod being of such size that when said flat surface abuts the inner surface of said gripping plate said fingers frictionally engage said pins and retain them against the upper inner edge of said backing plate;

said fingers being forced outwardly away from said pins when said rod is rotated so that said flat surface no longer engages said inner surface.

5. A loading fixture for positioning, aligning, and retaining a plurality of pins comprising:

a backing plate having a plurality of notches on the inner surface along the top edge thereof to receive said pins in vertical spaced alignment;

a stop bar on said inner surface parallel with and extending below said top edge;

said stop bar having a stairstep top surface so that pins having tapered ends will be directed with their end surfaces facing the same way;

a notched portion extending transversely along the inner surface near the top of said backing plate and below the stop bar;

a gripping plate fastened near its bottom portion to said backing plate;

said gripping plate having inwardly directed fingers along the top edge thereof to engage and retain said pins in said notches on said backing plate;

a cam rod in said notched portion;

said cam rod having a flat surface; and a removable handle for rotating said cam rod;

said rod being of such size that when said flat surface abuts the inner surface of said gripping plate said fingers frictionally engage said pins and retain them against the upper inner edge of said backing plate;

said fingers being forced outwardly away from said pins when said rod is rotated so that said flat surface no longer engages said inner surface.

References Cited by the Examiner

UNITED STATES PATENTS

| | | | |
|---|---|---|---|
| 2,584,297 | 2/1952 | Schmuldt | 29—203 |
| 2,624,107 | 1/1953 | Carpenter | 29—200 |
| 2,693,634 | 11/1954 | Huyett | 29—203 |
| 2,697,806 | 12/1954 | Gates | 317—236 |
| 2,699,594 | 1/1955 | Bowne | 29—25.3 |
| 2,703,856 | 3/1955 | Powers et al. | 318—236 |
| 2,739,558 | 3/1956 | Bieg | 29—203 |
| 2,765,516 | 10/1956 | Haegle | 29—25.3 |
| 2,801,603 | 8/1957 | Reichelt | 29—203 |
| 3,121,280 | 2/1964 | McFadden | 29—200 |

JOHN F. CAMPBELL, *Primary Examiner.*

THOMAS H. EAGER, *Examiner.*